United States Patent [19]
Jun et al.

[11] Patent Number: 5,828,044
[45] Date of Patent: Oct. 27, 1998

[54] NON-CONTACTING TYPE RADIO FREQUENCY RECOGNIZING CREDIT CARD SYSTEM

[75] Inventors: Young Sam Jun, Seoul; Ho Yun Lee, Kyunggi-do, both of Rep. of Korea

[73] Assignee: Kookmin Credit Card Co., Ltd., Seoul, Rep. of Korea

[21] Appl. No.: 765,729

[22] PCT Filed: Aug. 29, 1996

[86] PCT No.: PCT/KR96/00061

§ 371 Date: Feb. 13, 1997

§ 102(e) Date: Feb. 13, 1997

[87] PCT Pub. No.: WO97/00501

PCT Pub. Date: Jan. 3, 1997

[30] Foreign Application Priority Data

Mar. 14, 1996 [KR] Rep. of Korea ................... 1996/6854

[51] Int. Cl.⁶ .................................................. G06K 19/06
[52] U.S. Cl. .......................................... 235/380; 235/492
[58] Field of Search ..................................... 235/380, 492

[56] References Cited

FOREIGN PATENT DOCUMENTS

| | | |
|---|---|---|
| 0 254 595 | 7/1987 | European Pat. Off. . |
| 2 685 111 | 6/1993 | France . |
| 2 267 626 | 12/1993 | United Kingdom . |
| 94/22115 | 6/1994 | WIPO . |

*Primary Examiner*—Don Wong
*Attorney, Agent, or Firm*—Jacobson, Price, Holman & Stern, PPLC

[57] ABSTRACT

A non-contacting type radio frequency recognizing credit card system is disclosed. In the conventional credit card system, the card recognition is carried out by contactingly inserting a credit card (40) into a card reader which is connected to a card managing company. Therefore, the card may be damaged, and the card recognition time is extended. The non-contacting type radio frequency recognizing credit card system according to the present invention includes: an RF card (40) for being activated by receiving radio frequency from a card terminal (70) so as to transmit its own card number to the card terminal through radio frequency; the card terminal radiating a radio frequency to induce an electric generation in the RF card, and the card terminal transmitting a card number data (received through a radio frequency) to a wire-connected terminal computer (80); and the terminal computer reading the card number data from the card terminal to make an inquiry into a black list, to make a decision for issuing an approval of a transaction or a denying of the transaction, and to transmit the result of the decision to the card terminal.

5 Claims, 6 Drawing Sheets

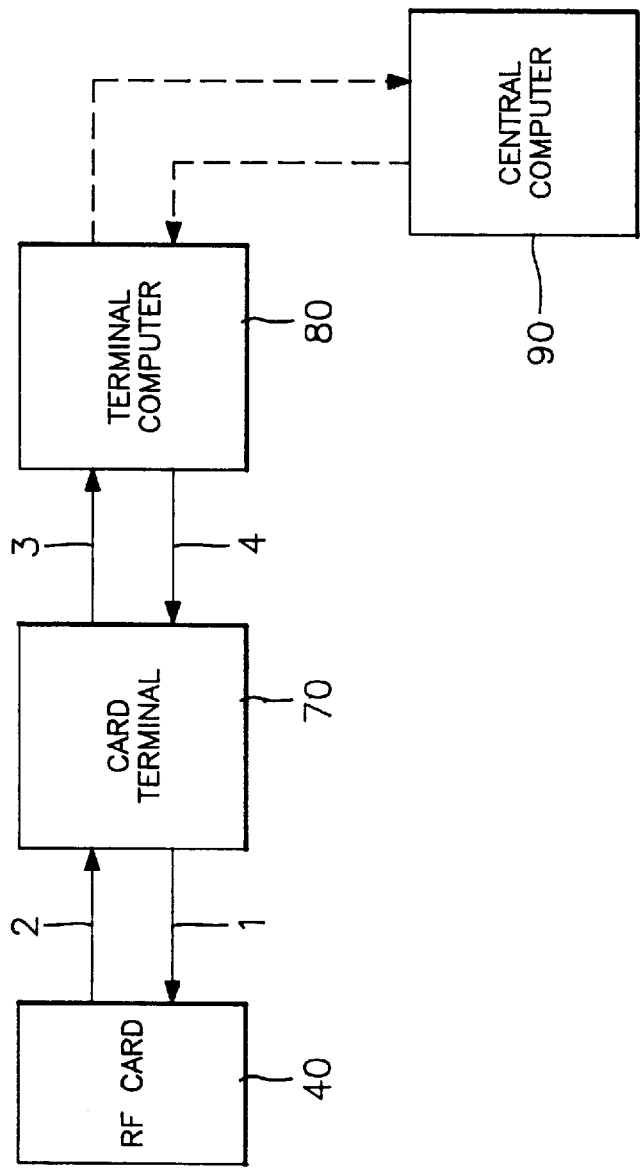

NON-CONTACTING TYPE RADIO FREQUENCY RECOGNIZING CREDIT CARD SYSTEM

FIELD OF THE INVENTION

The present invention relates to a credit card system, and more specifically, to a non-contacting type radio frequency recognizing credit card system in which a credit card inquiry is possible in a state with a credit card not contacted with a card reader, and in which the credit card inquiry time and the data exchange time between a credit card and a card reader are drastically reduced.

DESCRIPTION OF THE PRIOR ART

Generally, a credit card possessor can buy commodities and services without paying cash under the guarantee of the credit card managing company, and also can carry out non-passbook transactions with a bank through a cash payment apparatus.

The size of the credit card has been determined as 3.375 inches, 2.125 inches width and 0.03 inches thickness internationally so that they can be used worldwidely through subscribed stores. The data for judging on the authenticity of the credit card holder are stored in the magnetic strip of the credit card and in the card managing company. Upon verifying the data, the subscribed store approves the transaction.

FIGS. 1A and 1B illustrate the basic external appearance of a credit card.

As shown in these drawings, a credit card 10 has frontal face 20 on which there are shown a card number 21 consisting of 16 Arabian numerals, a name 22 of the card owner, an expiry dare 23 of the card, a name 24 of the card issuing company, a logo 25 of the card issuing Company, letters "local" "international" and a hologram 27 as the means for preventing illegal copying of the credit card.

In the rear face 30 of credit card, there are shown a magnetic strip 32 which stores the identification of the card owner, the paying passbook account number, and the validity of the credit card.

In case where a commodity or a service is to be paid by using such a credit card, the credit card is inserted into a card reader, so that the magnetic strip of the credit card would pass contactingly through the card reader. The credit card number thus read by the card reader is transmitted from the card reader through an electric line (telephone line) to the credit card managing company. The credit card managing company checks on the payment limit and on the existence or absence of dishonored transactions, and it transmits an approval number or a disapproval number to the card inquiry terminal.

However, the above described conventional card inquiry system takes too much time several seconds or several scores of seconds) in completing the card inquiry. Such a time consumption in the conventional system has been a serious impediment in broadening the area of the credit card utilization.

Another problem in the conventional system is that credit cards are apt to be damaged and thus the reading errors in the card reader are very frequent.

In the conventional system, the card reader reads the data of the magnetic strip by contacting with the magnetic strip, which may shorten the life of a credit card. When a credit card passes through a card reader, if the passing speed is too fast or too slow, then reading errors are occurred, and if the such an errors are repeated, the magnetic strip would be worn out and consequently the life of a credit card would be shortened.

SUMMARY OF THE INVENTION

The present invention is intended to overcome the above described disadvantages of the conventional system, and therefore, an object of the present invention is to provide a non-contacting type radio frequency recognizing card (hereinafter "RF card") system, so that the card reader may read the information in the card in a non-contacting manner. In the present invention, the information can be exchanged between a credit card and a card reader without being contacted with each other.

Another object of the present invention is to reduce the card-reading time drastically, so that a credit card may be used to pay traffic fares or the like which requires the card-reading time to be extremely short.

It is still another object of the present invention to provide a no-battery type RF credit card. In the present invention, the card information can be exchanged between the card and a card reader without battery in the card.

It is still another object of the present invention to provide a RF credit card comprising advanced payment function, in which a part of the IC memory of the RF credit card is designated as an area for storing a certain amount of money so as to incorporate an advance payment function, thereby making it possible to carry out off-line services.

It is still another object of the present invention to provide an RF credit card system in which a part of the IC memory of the credit card is designated as an area for debit card system, thereby providing an instant payment function.

In achieving the above objects, the non -contacting type radio frequency recognizing credit card system according to the present invention includes:

an RF card for being activated by receiving radio frequency from a card terminal so as to transmit its own card number to the card terminal;

the card terminal which is radiating a radio frequency to induce an electric generation in the RF card, and is transmitting a card number data to a terminal computer; and the terminal computer reading the card number data from the card terminal to make an inquiry to a black list (B/L), and to make a decision for issuing an approval of a transaction or a disapproval of the transaction, and to transmit the result of the decision to the card terminal.

BRIEF DESCRIPTION OF THE DRAWINGS

The above objects and other advantages of the present invention will become more apparent by describing in detail the preferred embodiment of the present invention with reference to the attached drawings in which:

FIG. 2 is a block diagram showing the constitution of the non-contacting type radio frequency recognizing credit card system according to the present invention;

DESCRIPTION OF THE PREFERRED EMBODIMENT

FIG. 2 is a schematic view showing the constitution of the system of the present invention. As shown in this drawing, the system of the present invention includes an RF card 40, a card terminal 70 and a terminal computer 80.

The card terminal 70 radiates a radio frequency through an antenna continuously or periodically to supply power to the RF card 40. Further the card terminal 70 reads a card number from the RF card 40, and transmits the received data to the terminal computer 80. And, conversely, the card terminal 70 receives data from the terminal computer 80, and transmits the data received from the terminal computer 80 to the RF card 40.

The terminal computer 80 receives card number data from the card terminal 70, and makes an inquiry for the data to a black list so as to make an immediate decision on an approval or disapproval of a transaction. The terminal computer 80, in the meantime, transmits the RF card transaction details to a central computer 90 periodically, and receives an updated black list from the central computer 90 to store it in itself.

As the terminal computer 80, a personal computer will be sufficient in most cases.

Figure 1A:
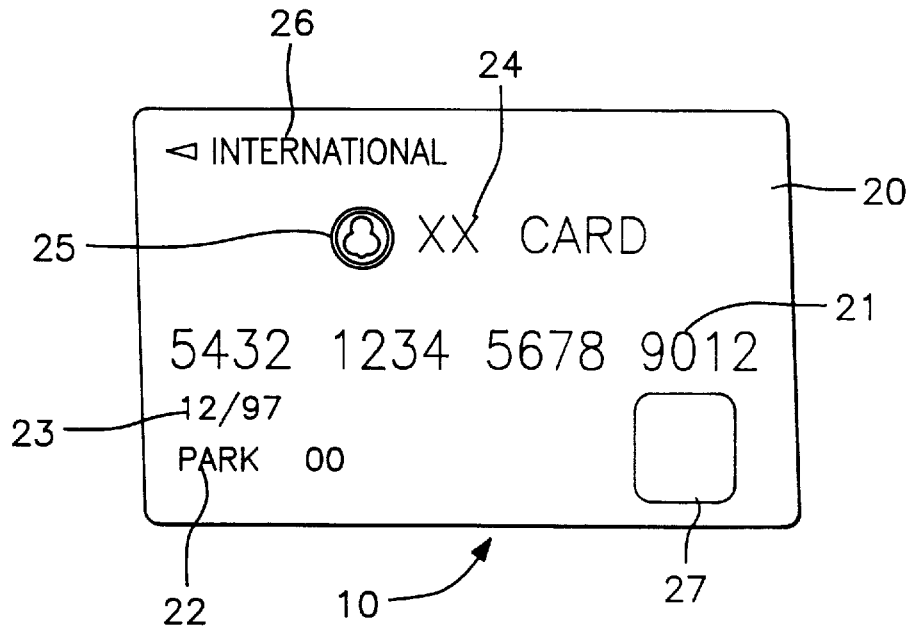
FIGS. 1A and 1B illustrate the frontal face and the rear face of the usual credit card.
Figure 1B:
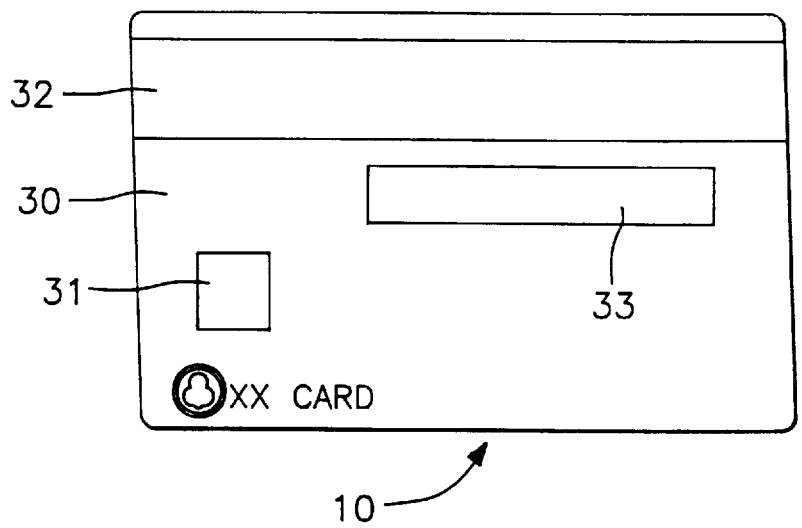
Figure 3:
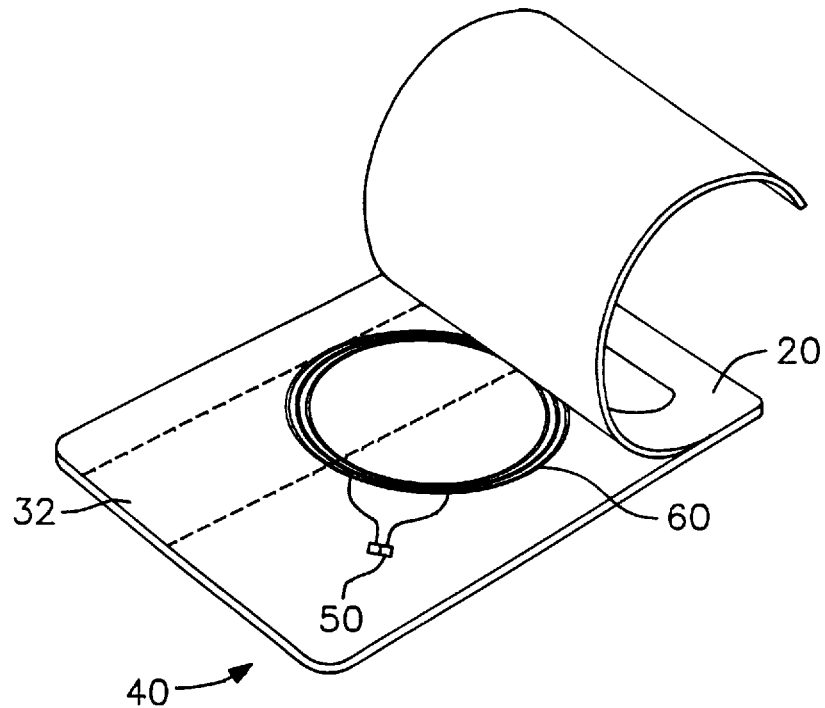
FIG. 3 illustrates the internal structure of the non-contacting type radio frequency recognizing credit card (RF card) according to the present invention.

FIG. 3 illustrates the internal structure of the RF card according to the present invention. As shown in this drawing, between a frontal face 20 and a magnetic strip 32, i.e., within the RF card 40, there is disposed an antenna coil 60 which consists of many turns of a thin wire concentrically coiled. There is further disposed an integrated circuit 50 which is connected to the antenna coil 60.

The antenna coil 60 and the integrated circuit (IC) 50 are thin enough not to cause a deformation to the standard size of the RF card 40.

Figure 4:
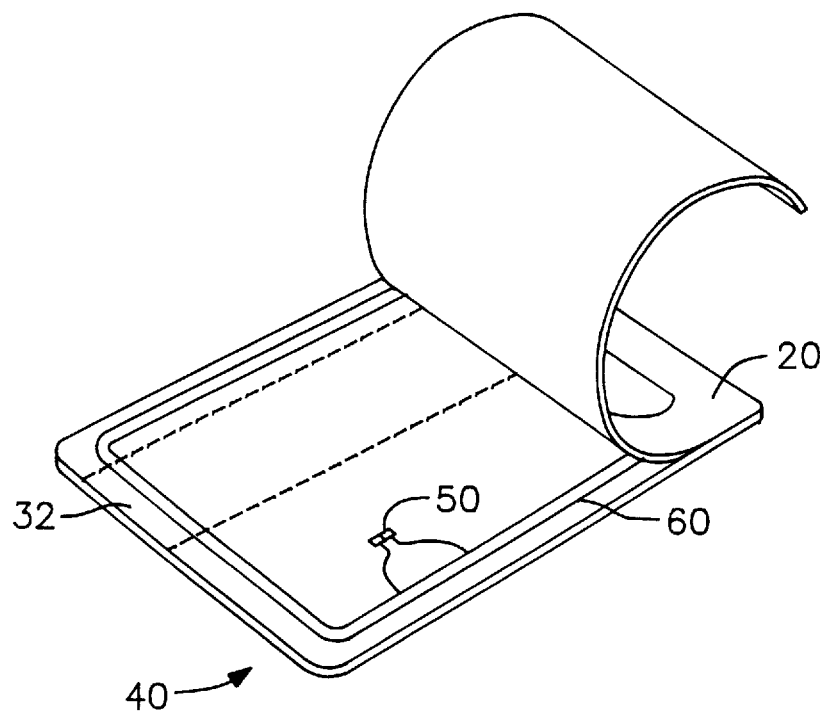
FIG. 4 illustrates the internal structure of another embodiment of the RF card according to the present invention.

FIG. 4 illustrates the internal structure of another embodiment of the RF card 40 according to the present invention. Here, the antenna coil 60 is wound around the inner edges of the card several times, and the IC 50 is disposed somewhere within the antenna coil 60.

Figure 5:
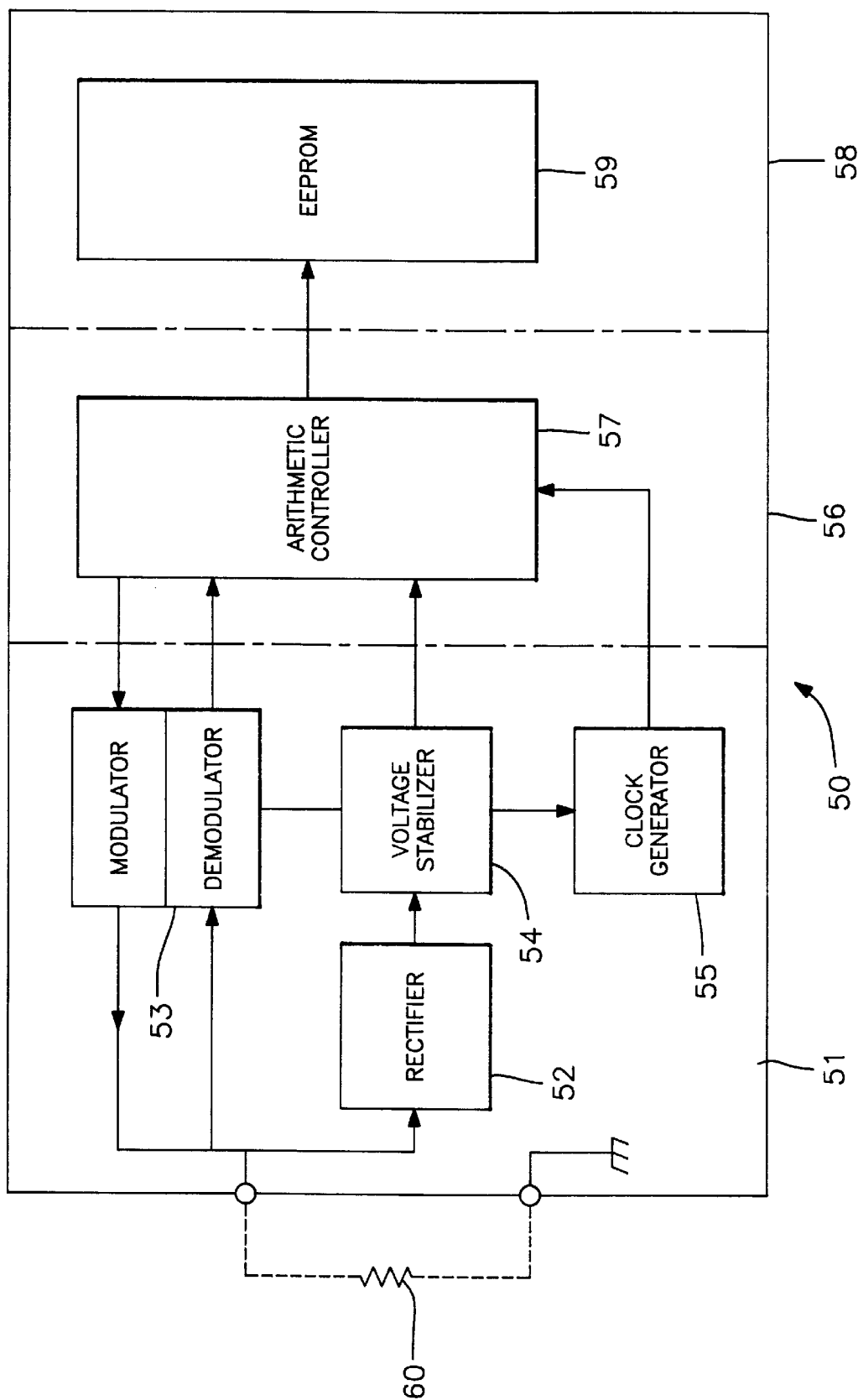
FIG. 5 is a block diagram showing the internal structure of the RF card according to the present invention.

FIG. 5 is a block diagram showing the internal structure of the IC 50 which is installed within the RF card according to the present invention. As shown in this drawing, the IC 50 is divided into an RF interface section 51, a control section 56 and a memory section 58.

The RF interface section 51 includes: a rectifier 52 for rectifying the voltage induced in the antenna 60; a modem 53 for demodulating and modulating the card data received and transmitted to and from the antenna 60; a voltage stabilizer 54 for supplying a stabilized voltage to the respective components of the IC; and a clock generator 55 for clocking an arithmetic controller.

The control section 56 includes an arithmetic controller 57 having a serial/parallel mutual converting circuit, a RAM and a ROM.

The memory section 58 includes an EEPROM 59 for electrically recording and erasing the data. A part of the memory of the EEPROM 59 is allocated to the area for storing some small amount of money for advance payment and/or to the area for debit card for instant payment, thereby providing an advance payment and/or instant payment function to the RF card.

Figure 6:
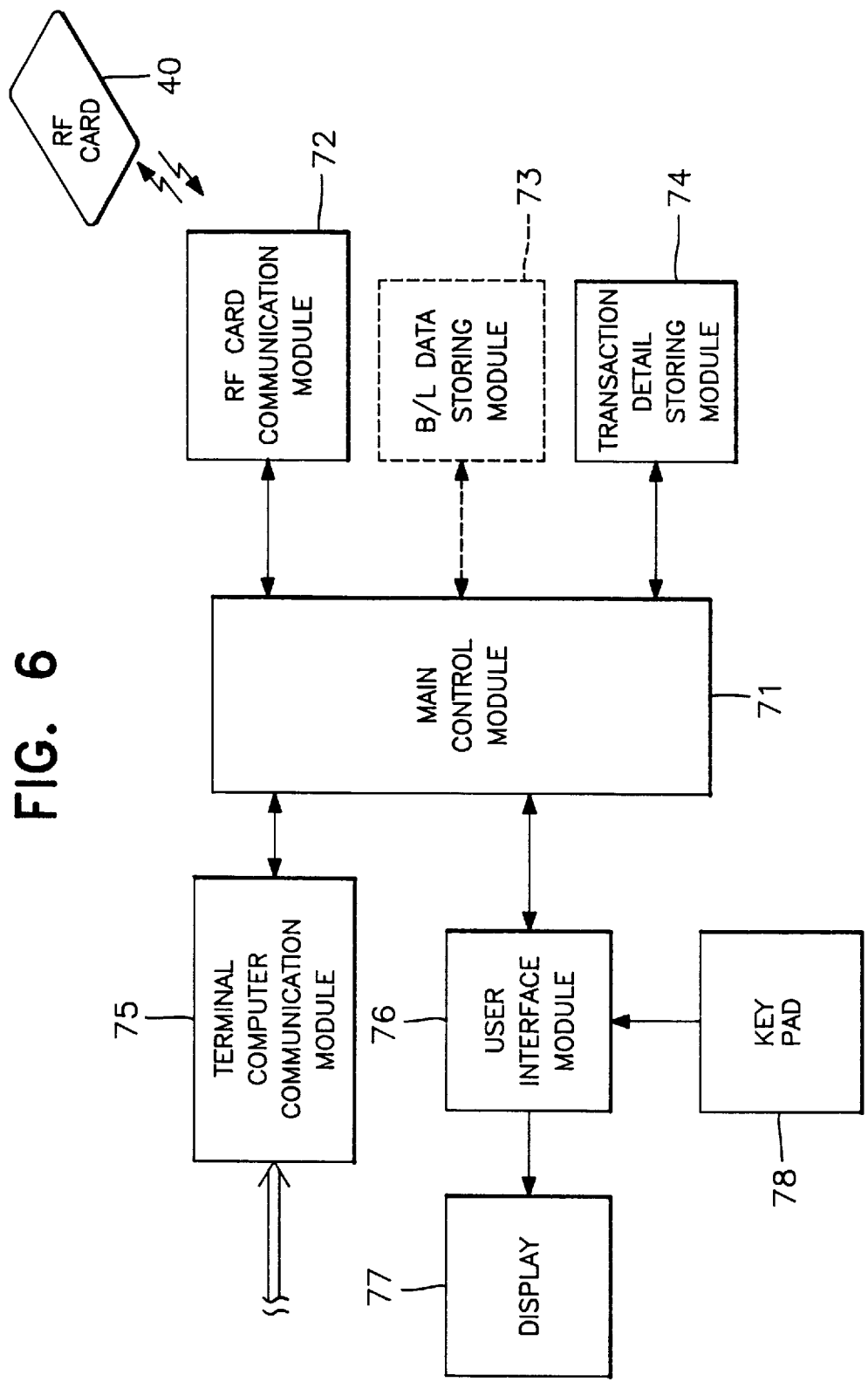
FIG. 6 is a block diagram showing -he constitution of the card terminal according to the present invention.

FIG. 6 is a block diagram showing the constitution of the card terminal according to the present invention. As shown in this drawing, the card terminal includes: a main control module 71; an RF card communication module 72 for radiating radio frequency so as to activate the RF card 40 and to exchange the data, being connected to the main control module 71; a transaction-detail-storing module 74 for storing the details of the transactions with the RF card; a terminal computer communication module 75 for exchanging the data with the terminal computer 80; and a user interface module 76 including a display for displaying the transaction amounts of the RF card user, and a key pad 78 for inputting a secret number to prevent stealing.

The card terminal 70 is further able to include a B/L data storing module 73, in which the black list is stored, and Into which the RF card data is directly enquired, and therefore, a transaction approval or disapproval can be instantly issued.

The B/L data storing module 73 updates the B/L data periodically or upon demands.

The system of the present invention constituted as above will now be described as to its operation referring to FIGS. 2 to 6.

The RF card 40 according to the present invention is a no-battery card in which the card receives power from outside through the antenna coil 60, so as to operate in a non-contacting manner.

If the RF card 40 is approached to a certain distance to the card terminal 70, the radio frequency radiated periodically or continuously by the RF card communication module (antenna) of the card terminal 70 induces voltages in the antenna coil 60 of the RF card 40. These voltages are used as a power for driving the RF card (Path ① of FIG. 2).

The effective distance between the RF card and the card terminal 70, within which power can be effectively supplied, is variable depending on shape of the antenna coil 60. In view of the card usability, safety and security, however, about 100 mm is desirable.

The voltage induced in the antenna coil 60 of the RF card 40 is supplied to the IC 50 to be rectified by the rectifier 52 of the RF interface section 51 and to be stabilized by the voltage stabilizer 54. And this rectified and stabilized voltage drives the arithmetic control circuit of the IC 50.

The arithmetic controller 57 modulates the card number data by means of the modem 53, and transmits the modulated data through the antenna coil 60 to the card terminal 70 (Path ② of FIG. 2).

The RF card communication module 72 of the card terminal 70 carries out the functions of data accessing, data encoding and data decoding (modulation and demodulation) in relation within the RF interface section 51 of the RF card 40 for communication with the RF card 40.

Thereafter, the main control module 71 of the card terminal 70 transmits the received card number data to the terminal computer 80, so that the terminal computer 80 may make an inquiry of the received card number data to the black list (path ③ of FIG. 2). After the card number inquiry the terminal computer 80 transmits an approval or a disapproval of the transaction to the card terminal 70 (Path ④ of FIG. 2).

The time consumed for the card inquiry (path ①–④) is not more than 3 ms, which owes to the fact that CMOS devices are used in the IC of the RF card.

The terminal computer 80 periodically receives the updated black list from the central computer, and transmits the transaction amounts of the approved transactions to the central computer 90, so that the transaction amounts may be billed to the user of the card.

Meanwhile, in case where the B/L data storing module 73 is installed in the card terminal 70 itself, the Paths ③ and ④ in which the card number which is read by the card terminal for a black list inquiry is transmitted to the terminal computer 80 and the inquiry results are received can be skipped, and therefore, the time for the card inquiry would be more shortened.

In this case also, the B/L data in the B/L data storing module 73 of the card terminal 70 has to be updated periodically or intermittently through the terminal computer 80.

If the RF card is to be used to pay fares of vehicles or to be used as a passport to be admitted in a restricted area, the card inquiry has to be completed in an extremely short period of time.

In order to meet this requirement, the card use data of the individual card possessor, such as when using a traffic means, the boarding time and the riding interval, have to be stored in the individual card. Otherwise, the numerous data of the individual cards have to be handled by the central traffic control computer simultaneously in an extremely short period of time, which is impossible. That's why the card payment system has not been applied to the traffic means yet.

However, the RF card of the present invention makes it possible to apply credit card payment system to traffic means. The procedure for this is as follows. The RF card 40 which is driven by receiving a radio frequency power from the card terminal 70 transmits the card number through the internal antenna coil 60 to the card terminal 70. Then the card terminal 70 receives the card number through the RF card communication module 72, and transmits the data to the terminal computer 80 so as to make an inquiry.

If the terminal computer 80 finds that the relevant card number does not belong to a B/L group, then the terminal computer 80 makes a decision of approval, and the current boarding time data and the relevant terminal ID number data are transmitted through the RF card communication module 72 of the card terminal 70 to the RF card through a radio frequency.

The RF card 40 receives through the antenna coil 60 the current boarding time data and the terminal ID number data which have been transmitted by the card terminal 70. Then the data are demodulated by the modem 53, and are stored in the EEPROM 59 in accordance with the transmission method of the arithmetic controller 57. This procedure is completed within several scores of ms.

Here, at the boarding terminal of the traffic means, the approval of the transaction is decided based only upon the inquiry into the black list, and therefore, the card inquiry and the handling time can be drastically reduced.

Further, at the getting-off terminal of the traffic means, the boarding data recorded on the RF card are read to determine the amount of fare based on the boarding distance and time. Therefore, the card inquiry and the handling time are as short as at the time of boarding.

In the meantime, the system of the present invention includes the functions of advance payment card for payment of highway tolls, bus fares, recreation facility fares and the like. For this purpose, a part of the chin memory of the RF card can be allocated as a small amount storing area.

Using as an advance payment card, the card terminal 70 has only to check the card by itself without transmitting information to other terminal. And therefore, in this case, the cost and time For system constructing can be a lot saved.

Figure 7:
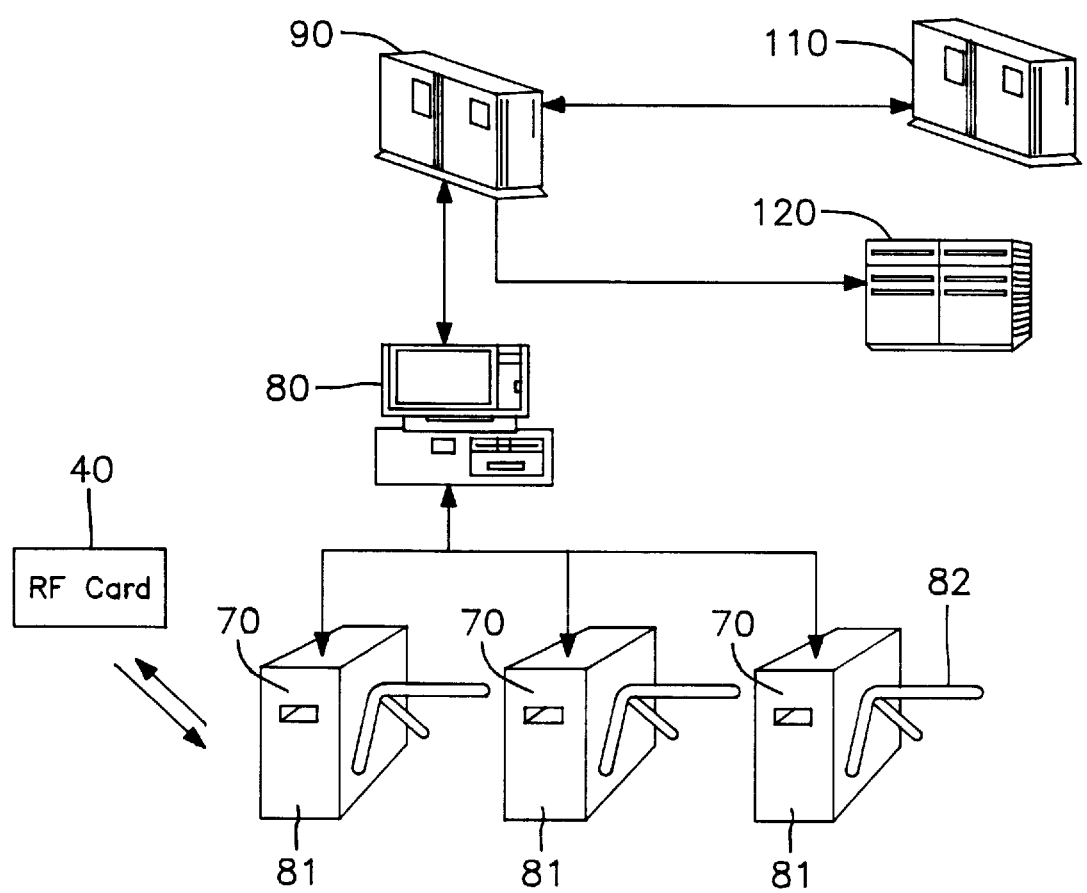
FIG. 7 illustrates the constitution of a subway fare collecting system as an example of the application of the present invention.

FIG. 7 illustrates the constitution of a subway fare collecting system as an example of the application of the present invention. The automatic fare collecting procedure for this case will be described below.

If a person who is to ride the subway makes the RF card 40 approached (about 10 cm) to the card terminal 70 which is attached on the subway gate 81, the RF card 40 receives power from the radio frequency of the card terminal 70 to activate the IC of the RF card 40. Then the RF card 40 transmits its own card number to the RF card communication module 72 (antenna) of the card terminal 70.

This card number is transmitted to the terminal computer 80 which carries out the summarizations for each subway station. Then the terminal computer 80 makes an inquiry for the card number into the black list, and thus, a transaction approval or a transaction disapproval is determined.

If the transaction is approved, the terminal computer which carries out the summarizations for each subway station transmits the boarding station data (the name of the subway station and the starting time) to the card terminal 70 which is installed on the subway gate 81. Then the card terminal 70 in turn transmits the same data to the RF card 40 through the radio frequency, and at the same time, makes the gate opened, while a display of the card terminal displays the already used amount for the month.

Meanwhile, if the card terminal 70 is provided with a B/L data storing module 73 as shown with the dotted lines in FIG. 6, then the card inquiry time is shortened, and the construction of the system becomes simple. In this case as in the above described case, updated B/L data are supplied from the card managing company to the B/L data storing module 73 so as to update it.

Upon arriving to the destination station, if the user of the RF card 40 makes the RF card 40 approached to the card terminal 70 of the subway gate to within a certain distance (10 cm), then the RF card 40 is activated by the radio frequency of the card terminal, so that the card number data and the boarding station data would be transmitted through the card terminal 70 to the terminal computer 80.

Based on the received data, the terminal computer of the destination station calculates the fare to settle the account. Then the terminal computer makes the total used amount displayed on the display of the subway station gate, and the same data are transmitted to the RF card to be stored there.

The terminal computer 80 which carries out the summarizations for each subway station receives the black list of the day from the card managing company 110 through the central computer 90 periodically or intermittently to update the black list. And, the terminal computer 80 transmits the transaction data of the individual cards to the central computer 90.

The central computer 90 summarizes the settled transaction data to transmit at to the card managing company.

The card managing company 110 transfers the amount of the collected subway fares to the bank account of the subway corporation 120 based on the settled results.

The data exchanges between the terminal computer 80 and the central computer 90 are carried out independently from the data exchanges between the card terminal 70 and the terminal computer 80. The reason is that it is not necessary for the data exchanges between the terminal computer 80 and the central computer 90 to be carried out in short time, while the data exchanges between the RF card 40 and the card terminal 70 and between the card terminal 70 and the terminal computer 80 should be carried out in a very short time.

Actually, the RF card checking time is not longer than 0.1 seconds (100 ms).

The above described subway fare automatic collection system brings the many advantages. That is, the user gains the advantage of eliminating the inconvenience of buying a ticket, and of carrying out cash. And, the user can enjoy the speedy checking during the passing through the subway gate. Furthermore, the present invention can be applied to other traffic means in common with the subway.

From the stand point of subway corporation, the account settling can be carried out in an automatic manner so as to improve the accounting efficiency. Namely, the system of the present invention can save the ticket manufacturing and selling costs, and can promote the passenger handling speed through the rapid checking at the subway gate.

The system of the present invention also makes it possible to pay the taxi fare by means of the credit card. The off-line credit card paying system for paying the taxi fare is almost same as the subway fare automatic collecting system.

In applying this system to taxi fare, the only difference is that the terminal computer which is installed at each car belonging to a moving chain system receives the updated black list data through an wireless telephone line or through an ordinary telephone line at home or at a gas station from a VAN service company. The fare amounts of the approved transactions are automatically transferred through the central computer to the card managing company.

It would be practical, however, for this taxi fare payment system based on credit card to be constituted in the form of off-line system. Particularly, n this taxi fare payment system based on credit card, a simple printer may be connected to the terminal computer, so that receipts can be issued.

By this taxi fare payment system based on credit card, it would be possible to use taxi without cash, and further, other traffic means can be utilized in common with taxi.

According to the present invention as described above, the post payment system can be extended to bus, train, taxi, subway and all other traffic means. Further, through the card recognition method, the RF card of the present invention can be applied to an advance payment method or to a debit card method.

Particularly, because the RF card of the present invention is a no-battery type, the problem that the life expectancy of the card is determined by the life expectancy of the battery is overcome. Therefore, the credit card system of the present invention can be conveniently applied to an electronic identification card, an admittance card for restricted areas, a recreation facility using card, a public telephone card, a highway toll card, a medical insurance card and many other cards.

Further, a magnetic strip may be provided on the RF card of the present invention like the ordinary cards, so that the card may be used in both a contacting manner and non-contacting manner.

We claim:

1. A non-contacting type radio frequency recognizing credit card system comprising:

a batteryless type RF card having an antenna coil wound around the inner edges of said RF card within said card several times and an IC disposed within said antenna coil, and being energized by received radio wave from a card terminal so as to transmit its own card number to said card terminal by a radio frequency;

said card terminal radiating a radio wave to generate an indused electromotive force in said RF card, receiving said card number data by RF, and transmitting the card number data, received through a radio frequency, to a wire-connected terminal computer for an inquiry to a black list; and said terminal computer reading the card number data from said card terminal to make an inquiry to a black list which is updated from the central computer periodically or intermittently, to make a decision for issuing an approval of a transaction or a disapproval of the transaction, and to transmit the result of the decision to said card terminal.

2. The non-contacting type radio frequency recognizing credit card system as claimed in claim 1, wherein said IC in RF card comprises:

an RF interface section including a rectifier, a modem, a voltage stabilizer, and a clock generator;

a control section including an arithmetic controller internally having a serial/parallel mutual converting circuit; and a memory section including an EEPROM for electrically recording and erasing the data.

3. The non-contacting type radio frequency recognizing credit card system as claimed in claim 2, wherein a part of the memory of said EEPROM is allocated for storing a small amount of an advance payment and/or for a debit card system.

4. The non-contacting type radio frequency recognizing credit card system as claimed in claim 1, wherein said card terminal comprises:

a main control module;

an RF card communication module for exchanging data with said RF card and for activation of said RF card;

a transaction detail storing module; and a terminal computer communication module for exchanging data with said terminal computer.

5. A non-contacting type radio frequency recognizing credit card system comprising:

a batteryless type RF card having an antenna coil wound around the inner edges of said RF card within said card several times and an IC disposed within said antenna coil, and being energized by received radio wave from a card terminal so as to transmit its own card number to said card terminal by a radio frequency;

said card terminal radiating a radio wave to generate an indused electromotive force in said RF card, and receiving said card number data by RF, and having a black list data storage module which updated black list from the central computer through the terminal computer periodically or intermittently, to make a decision for issuing an approval of a transaction or a disapproval of the transaction; and a terminal computer for receiving and summarizing the details of transaction data transmitted from said card terminal to transmit the summarized data to the central computer, and for receiving updated black list data from said central computer to transmit them to said card terminal.

* * * * *

(12) EX PARTE REEXAMINATION CERTIFICATE (6431st)
United States Patent
Jun et al.

(10) Number: US 5,828,044 C1
(45) Certificate Issued: Sep. 16, 2008

(54) NON-CONTACTING TYPE RADIO FREQUENCY RECOGNIZING CREDIT CARD SYSTEM

(75) Inventors: Young Sam Jun, Seoul (KR); Ho Yun Lee, Kyunggi-do (KR)

(73) Assignee: Smart Systems Co., LLC, Lloyd Harbor, NY (US)

Reexamination Request:
No. 90/010,013, Oct. 9, 2007

Reexamination Certificate for:
Patent No.: 5,828,044
Issued: Oct. 27, 1998
Appl. No.: 08/765,729
Filed: Feb. 13, 1997

(22) PCT Filed: Aug. 29, 1996
(86) PCT No.: PCT/KR96/00061
§ 371 (c)(1),
(2), (4) Date: Feb. 13, 1997
(87) PCT Pub. No.: WO97/00501
PCT Pub. Date: Jan. 3, 1997

(30) Foreign Application Priority Data

Jun. 16, 1995 (KR) .......................................... 1995/16057
Mar. 14, 1996 (KR) ........................................... 1996/6854

(51) Int. Cl.
*G07C 9/02* (2006.01)
*G07F 7/08* (2006.01)
*G06K 19/077* (2006.01)
*G06K 7/00* (2006.01)

(52) U.S. Cl. .......................................... 235/380; 235/492
(58) Field of Classification Search .................. None
See application file for complete search history.

(56) References Cited

U.S. PATENT DOCUMENTS

| 4,899,036 A | 2/1990 | MCrindle et al. |
| 5,053,774 A | 10/1991 | Schuermann et al. |
| 5,191,193 A | 3/1993 | Le Roux |
| 5,286,955 A | 2/1994 | Klosa |
| 5,396,558 A | 3/1995 | Ishiguro et al. |

FOREIGN PATENT DOCUMENTS

| EP | 0254595 | 1/1988 |
| GB | 2267626 | 8/1993 |

*Primary Examiner*—James Menefee

(57) ABSTRACT

A non-contacting type radio frequency recognizing credit card system is disclosed. In the conventional credit card system, the card recognition is carried out by contactingly inserting a credit card (40) into a card reader which is connected to a card managing company. Therefore, the card may be damaged, and the card recognition time is extended. The non-contacting type radio frequency recognizing credit card system according to the present invention includes: an RF card (40) for being activated by receiving radio frequency from a card terminal (70) so as to transmit its own card number to the card terminal through radio frequency; the card terminal radiating a radio frequency to induce an electric generation in the RF card, and the card terminal transmitting a card number data (received through a radio frequency) to a wire-connected terminal computer (80); and the terminal computer reading the card number data from the card terminal to make an inquiry into a black list, to make a decision for issuing an approval of a transaction or a denying of the transaction, and to transmit the result of the decision to the card terminal.

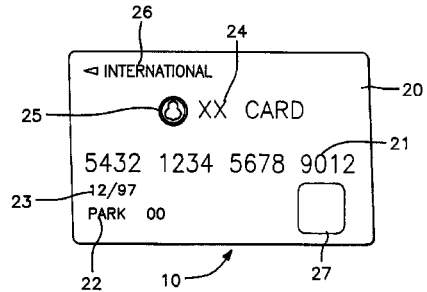

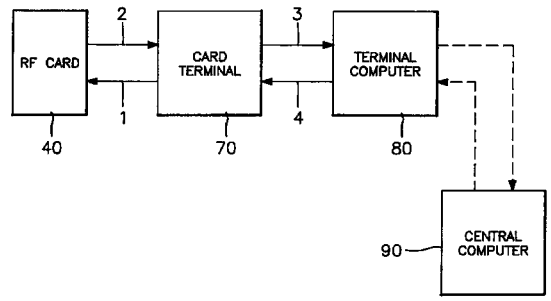

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 5 are determined to be patentable as amended.

Claims 2–4, dependent on an amended claim, are determined to be patentable.

New claims 6–48 are added and determined to be patentable.

1. A non-contacting type radio frequency recognizing credit card system comprising:
   a batteryless type RF card having an antenna coil wound around the inner edges of said RF card within said card several times and an IC disposed within said antenna coil, and being energized by received radio wave from a card terminal so as to transmit its own card number to said card terminal by a radio frequency;
   said card terminal radiating a radio wave to generate an [indused] *induced* electromotive force in said RF card, receiving said card number data by RF, and transmitting the card number data, received through a radio frequency, to a wire-connected terminal computer for an inquiry to a black list; and
   said terminal computer reading the card number data from said card terminal to make an inquiry to a black list which is updated from [the] *a* central computer periodically or intermittently, to make a decision for issuing an approval of a transaction or a disapproval of the transaction, and to transmit the result of the decision to said card terminal.

5. A non-contacting type radio frequency recognizing credit card system comprising:
   a batteryless type RF card having an antenna coil wound around the inner edges of said RF card within said card several times and an IC disposed within said antenna coil, and being energized by received radio wave from a card terminal so as to transmit its own card number to said card terminal by a radio frequency;
   said card terminal radiating a radio wave to generate an [indused] *induced* electromotive force in said RF card, and receiving said card number data by RF, and having a black list data storage module which updated black list from [the] *a* central computer through the terminal computer periodically or intermittently, to make a decision for issuing an approval of a transaction or a disapproval of the transaction; and
   a terminal computer for receiving and summarizing the details of transaction data transmitted from said card terminal to transmit the summarized data to the central computer, and for receiving updated black list data from said central computer to transmit them to said card terminal.

*6. A non-contacting type radio frequency recognizing credit card system comprising:*
   *a batteryless type RF card having an antenna coil wound around the inner edges of said RF card within said card several times and an IC disposed within said antenna coil, and being energized by received radio wave from a card terminal so as to transmit a credit card number to said card terminal by a radio frequency;*
   *said card terminal, in a transit system, radiating a radio wave to generate an induced electromotive force in said RF card, receiving said credit card number by RF, and transmitting the credit card number, received through a radio frequency, to a wire-connected terminal computer for an inquiry to a black list; and*
   *said terminal computer reading the credit card number from said card terminal to make an inquiry to a black list which is updated from a central computer periodically or intermittently, to make a decision for issuing an approval of a transaction or a disapproval of the transaction, and to transmit the result of the decision to said card terminal.*

*7. The non-contacting type radio frequency recognizing credit card system as claimed in claim 6, wherein said card number comprises 16 numerals.*

*8. The non-contacting type radio frequency recognizing credit card system as claimed in claim 6, wherein said card number comprises numeral shown on the frontal face of the card.*

*9. The non-contacting type radio frequency recognizing credit card system as claimed in claim 6, wherein said terminal computer makes the decision for issuing the approval or the disapproval immediately following the inquiry to the black list.*

*10. The non-contacting type radio frequency recognizing credit card system as claimed in claim 6, wherein said card terminal comprises a card terminal in a subway station.*

*11. The non-contacting type radio frequency recognizing credit card system as claimed in claim 6, further comprising an exit card terminal to determine a time of exiting.*

*12. The non-contacting type radio frequency recognizing credit card system as claimed in claim 6, wherein the terminal computer is coupled to a gate in a subway station.*

*13. The non-contacting type radio frequency recognizing credit card system as claimed in claim 12, wherein the terminal computer controls opening of the gate.*

*14. The non-contacting type radio frequency recognizing credit card system as claimed in claim 6, further comprising a post-payment system.*

*15. The non-contacting type radio frequency recognizing credit card system as claimed in claim 6, wherein the transit system comprises a subway system.*

*16. The non-contacting type radio frequency recognizing credit card system as claimed in claim 6, wherein the transit system comprises a bus system.*

*17. The non-contacting type radio frequency recognizing credit card system as claimed in claim 6, wherein the transit system comprises taxis.*

*18. The non-contacting type radio frequency recognizing credit card system as claimed in claim 6, wherein the transit system comprises a train system.*

*19. The non-contacting type radio frequency recognizing credit card system as claimed in claim 1, wherein said card number comprises 16 numerals.*

*20. The non-contacting type radio frequency recognizing credit card system as claimed in claim 1, wherein said card number comprises numeral shown on the frontal face of the card.*

21. The non-contacting type radio frequency recognizing credit card system as claimed in claim 1, wherein said terminal computer makes the decision for issuing the approval or the disapproval immediately following the inquiry to the black list.

22. The non-contacting type radio frequency recognizing credit card system as claimed in claim 1, wherein said card terminal comprises a card terminal in a subway station.

23. The non-contacting type radio frequency recognizing credit card system as claimed in claim 1, further comprising an exit card terminal to determine a time of exiting.

24. The non-contacting type radio frequency recognizing credit card system as claimed in claim 1, wherein the terminal computer is coupled to a gate in a subway station.

25. The non-contacting type radio frequency recognizing credit card system as claimed in claim 24, wherein the terminal computer controls opening of the gate.

26. The non-contacting type radio frequency recognizing credit card system as claimed in claim 1, further comprising a post-payment system.

27. The non-contacting type radio frequency recognizing credit card system as claimed in claim 1, wherein said card terminal comprises a card terminal in a transit system.

28. The non-contacting type radio frequency recognizing credit card system as claimed in claim 27, wherein the transit system comprises a subway system.

29. The non-contacting type radio frequency recognizing credit card system as claimed in claim 27, wherein the transit system comprises a bus system.

30. The non-contacting type radio frequency recognizing credit card system as claimed in claim 27, wherein the transit system comprises taxis.

31. The non-contacting type radio frequency recognizing credit card system as claimed in claim 27, wherein the transit system comprises a train system.

32. The non-contacting type radio frequency recognizing credit card system as claimed in claim 5, wherein said card number comprises 16 numerals.

33. The non-contacting type radio frequency recognizing credit card system as claimed in claim 5, wherein said card number comprises numeral shown on the frontal face of the card.

34. The non-contacting type radio frequency recognizing credit card system as claimed in claim 5, wherein said terminal computer makes the decision for issuing the approval or the disapproval immediately following the inquiry to the black list.

35. The non-contacting type radio frequency recognizing credit card system as claimed in claim 5, wherein said card terminal comprises a card terminal in a subway station.

36. The non-contacting type radio frequency recognizing credit card system as claimed in claim 5, further comprising an exit card terminal to determine a time of exiting.

37. The non-contacting type radio frequency recognizing credit card system as claimed in claim 5, wherein the terminal computer is coupled to a gate in a subway station.

38. The non-contacting type radio frequency recognizing credit card system as claimed in claim 37, wherein the terminal computer controls opening of the gate.

39. The non-contacting type radio frequency recognizing credit card system as claimed in claim 5, further comprising a post-payment system.

40. The non-contacting type radio frequency recognizing credit card system as claimed in claim 5, wherein said card terminal comprises a card terminal in a transit system.

41. The non-contacting type radio frequency recognizing credit card system as claimed in claim 40, wherein the transit system comprises a subway system.

42. The non-contacting type radio frequency recognizing credit card system as claimed in claim 40, wherein the transit system comprises a bus system.

43. The non-contacting type radio frequency recognizing credit card system as claimed in claim 40, wherein the transit system comprises taxis.

44. The non-contacting type radio frequency recognizing credit card system as claimed in claim 40, wherein the transit system comprises a train system.

45. A non-contacting type radio frequency recognizing credit card system comprising:

a batteryless type RF card having an antenna coil wound around the inner edges of said RF card within said card several times and an IC disposed within said antenna coil, and being energized by received radio wave from a card terminal so as to transmit a credit card number comprising 16 numerals to said card terminal by a radio frequency;

said card terminal, in a subway station, radiating a radio wave to generate an induced electromotive force in said RF card, receiving said credit card number by RF, and transmitting the credit card number, received through a radio frequency, to a wire-connected terminal computer for an inquiry to a black list; and said terminal computer reading the credit card number from said card terminal to make an inquiry to a black list which is updated from a central computer periodically or intermittently, to make a decision for issuing an approval of a transaction or a disapproval of the transaction, and to transmit the result of the decision to said card terminal;

wherein the terminal computer is coupled to a gate in the subway station to control opening of the gate; and wherein said terminal computer makes the decision for issuing the approval or the disapproval immediately following the inquiry to the black list.

46. A non-contacting type radio frequency recognizing credit card system comprising:

a batteryless type RF card having an antenna coil wound around the inner edges of said RF card within said card several times and an IC disposed within said antenna coil, and being energized by received radio wave from a card terminal so as to transmit a credit card number comprising 16 numerals to said card terminal by a radio frequency;

said card terminal, in a bus, radiating a radio wave to generate an induced electromotive force in said RF card, receiving said credit card number by RF, and transmitting the credit card number, received through a radio frequency, to a wire-connected terminal computer for an inquiry to a black list; and said terminal computer reading the credit card number from said card terminal to make an inquiry to a black list which is updated from a central computer periodically or intermittently, to make a decision for issuing an approval of a transaction or a disapproval of the transaction, and to transmit the result of the decision to said card terminal;

wherein said terminal computer makes the decision for issuing the approval or the disapproval immediately following the inquiry to the black list.

47. A non-contacting type radio frequency recognizing credit card system comprising:

a batteryless type RF card having an antenna coil wound around the inner edges of said RF card within said card several times and an IC disposed within said antenna coil, and being energized by received radio wave from a card terminal so as to transmit a credit card number comprising 16 numerals to said card terminal by a radio frequency;

said card terminal, in a train station, radiating a radio wave to generate an induced electromotive force in said RF card, receiving said credit card number by RF, and transmitting the credit card number, received through a radio frequency, to a wire-connected terminal computer for an inquiry to a black list; and said terminal computer reading the credit card number from said card terminal to make an inquiry to a black list which is updated from a central computer periodically or intermittently, to make a decision for issuing an approval of a transaction or a disapproval of the transaction, and to transmit the result of the decision to said card terminal;

wherein the terminal computer is coupled to a gate in the train station to control opening of the gate; and wherein said terminal computer makes the decision for issuing the approval or the disapproval immediately following the inquiry to the black list.

48. A non-contacting type radio frequency recognizing credit card system comprising:

a batteryless type RF card having an antenna coil wound around the inner edges of said RF card within said card several times and an IC disposed within said antenna coil, and being energized by received radio wave from a card terminal so as to transmit a credit card number comprising 16 numerals to said card terminal by a radio frequency;

said card terminal, in a taxi, radiating a radio wave to generate an induced electromotive force in said RF card, receiving said credit card number by RF, and transmitting the credit card number, received through a radio frequency, to a wire-connected terminal computer for an inquiry to a black list; and said terminal computer reading the credit card number from said card terminal to make an inquiry to a black list which is updated from a central computer periodically or intermittently, to make a decision for issuing an approval of a transaction or a disapproval of the transaction, and to transmit the result of the decision to said card terminal;

wherein said terminal computer makes the decision for issuing the approval or the disapproval immediately following the inquiry to the black list.

* * * * *